May 18, 1943. T. W. JOHNSON 2,319,737
PLANTER
Filed March 27, 1940 4 Sheets-Sheet 1

INVENTOR:
THEODORE W. JOHNSON
BY
ATTORNEYS.

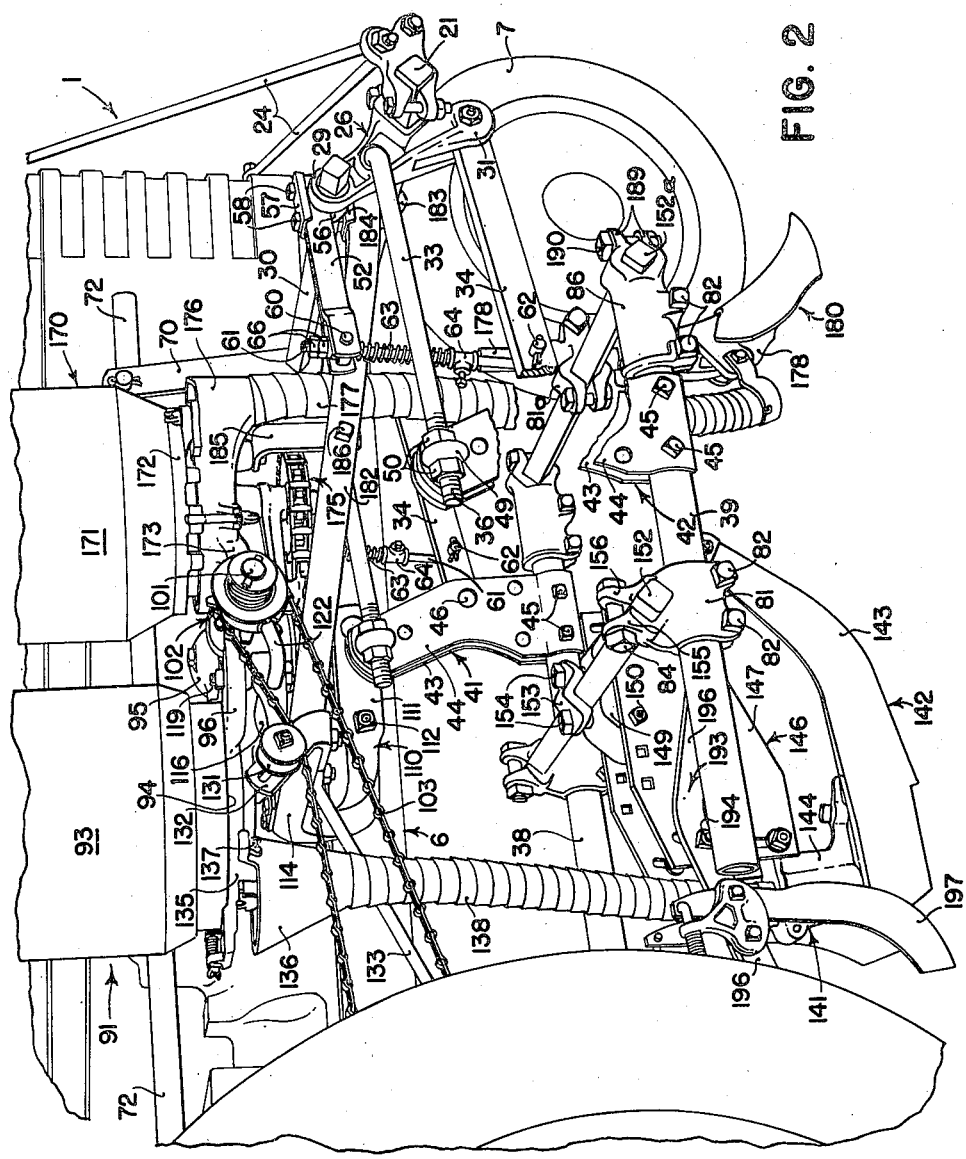

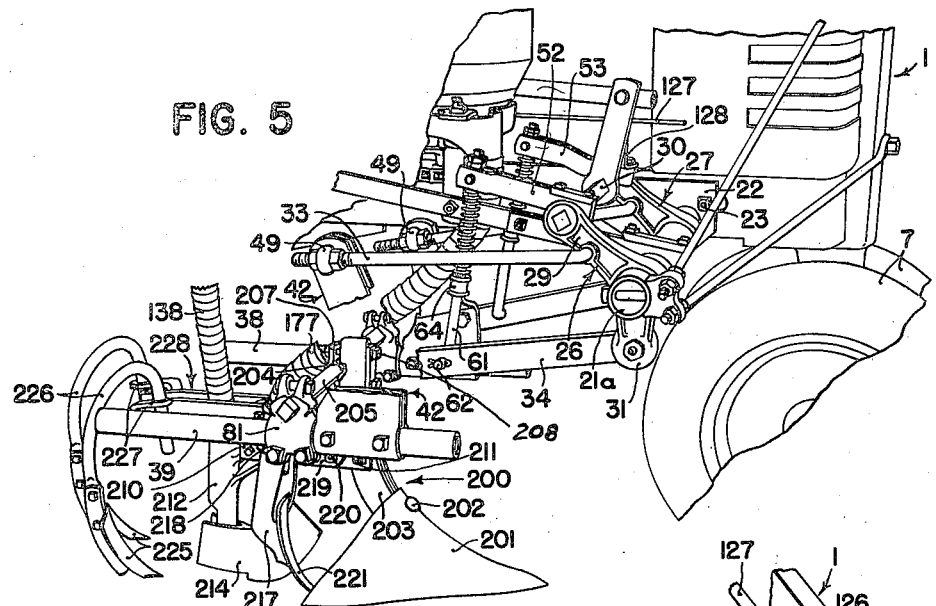
FIG. 5
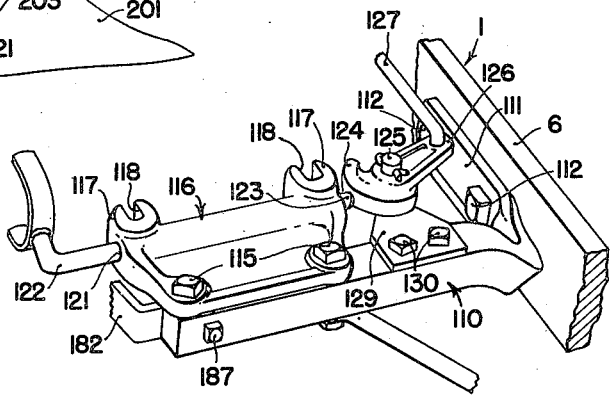
FIG. 4
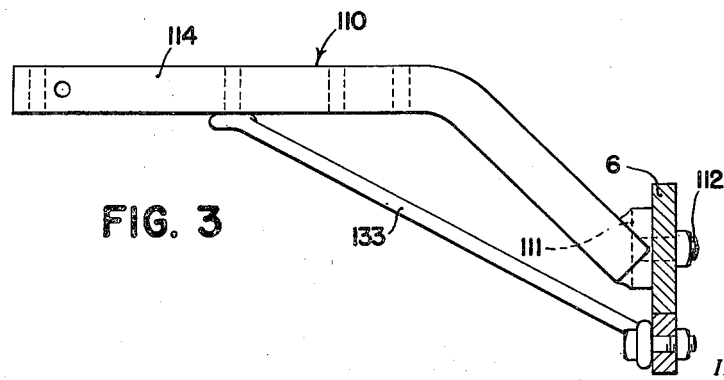
FIG. 3
INVENTOR:
THEODORE W. JOHNSON
ATTORNEYS.

May 18, 1943.  T. W. JOHNSON  2,319,737
PLANTER
Filed March 27, 1940  4 Sheets-Sheet 4
FIG. 6
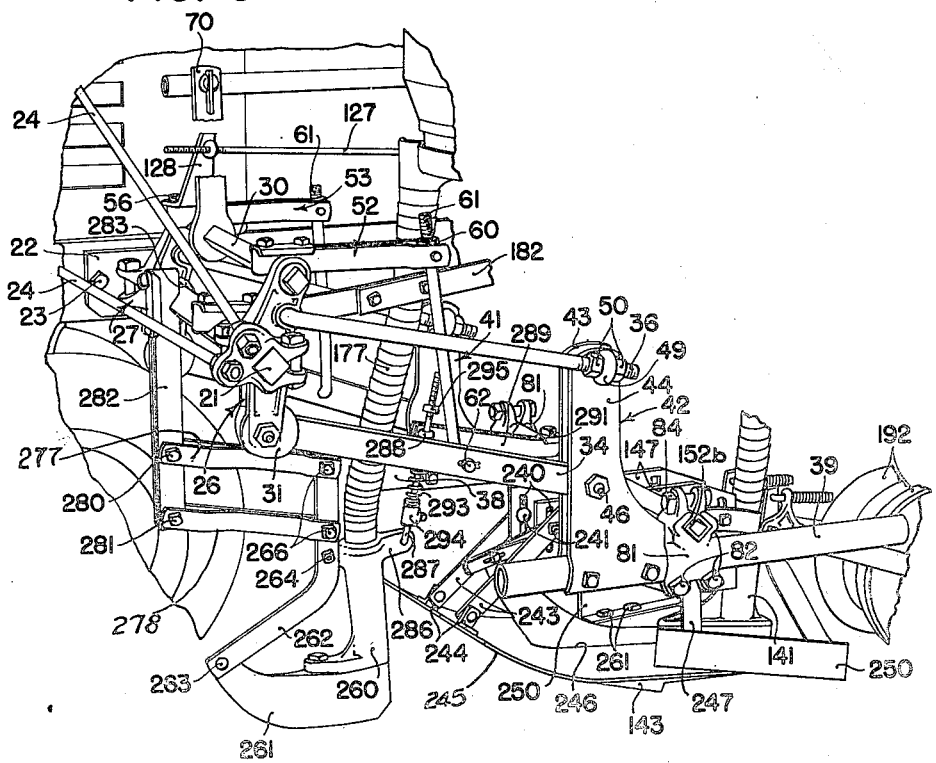
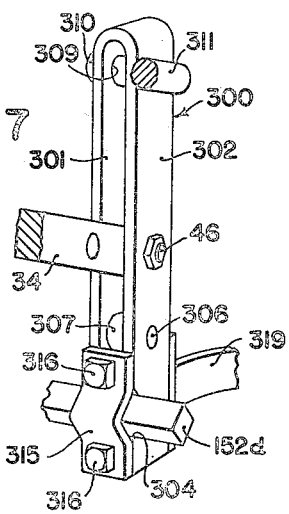
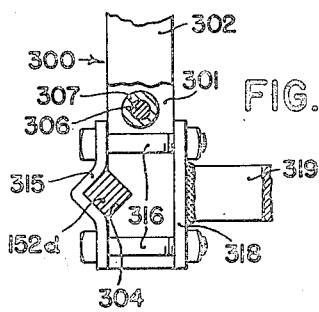
INVENTOR:
THEODORE W. JOHNSON
ATTORNEYS.

Patented May 18, 1943

2,319,737

UNITED STATES PATENT OFFICE 2,319,737

PLANTER

Theodore W. Johnson, Moline, Ill., assignor to Deere & Company, Moline, Ill., a corporation of Illinois Application March 27, 1940, Serial No. 326,196

26 Claims. (Cl. 111—59)

The present invention relates generally to agricultural machines, and more particularly to planting implements.

The object and general nature of the present invention is the provision of an agricultural machine which includes planting mechanism and which utilizes cultivator beams or tool supporting members for supporting the planter runner or other furrow opener. More particularly it is an object of the present invention to provide a tractor mounted implement which by a simple change in equipment can be used to plant cotton, corn, or other row crops, or to cultivate later on when the crop comes up. Further, it is a feature of this invention to provide both planting and fertilizing mechanism in a novel association with the cultivator beams, which need not be detached when changing from planting and fertilizing over to cultivating.

More specifically, it is a feature of the present invention to provide a planting attachment for a tractor mounted cultivator, in which the planter runner or other furrow opener is supported by a rigid transverse bar on the rear portions of the cultivator beams, the latter being generally connected with the tractor through link means. As a result of this construction, the outfit is quite flexible since the planter runners or other furrow openers are disposed a considerable distance away from their points of connection with the tractor draft bar or other attaching means. Further, it is a feature of this invention to provide an agricultural machine in which the planter furrow opener and associated parts are connected with the tractor or other supporting frame means at relatively widely spaced points, thus providing a sturdy construction and entirely eliminating any tendency for the tools to oscillate or "whip" in operation. Attempts have heretofore been made to apply planting units to cultivator supporting beams, but in general such attempts have not been wholly successful due to the tendency of the planter runners to whip or oscillate. This arises because forces, not generally present when operating the outfit as a cultivator, are built up or are present when operating the outfit as a planter. Further, connecting the furrow opener of the planting unit at two widely spaced bearing points with the tractor or other supporting frame means provides for accurate row spacing, this again affording a lateral rigidity which is not necessarily required when operating the outfit as a cultivator. It is still further a feature of this invention to provide an agricultural machine in which there are two planting units, preferably one at each side of the tractor, but in which the planter runners are supported in such manner on the cultivator beams that the desired lateral rigidity and resistance to whipping is present but without a connection extending transversely from one unit to the other.

A further feature of this invention is the provision of a planting attachment or the like in which the planter furrow opener is supported on a pair of cultivator beams so that lateral adjustment to secure various row spacings is easily effected. Still further, it is a feature of this invention to provide an attachment having both planting and fertilizing units, each with its own furrow opener and both furrow openers being supported in a novel manner on a pair of cultivator tool beams.

An additional feature of the present invention resides in the provision of a planting and/or fertilizing attachment having disconnectible drive means and adapted to be mounted on a tractor cultivator in such a way that raising the cultivator beams automatically disconnects the drive to the planting and fertilizing mechanism. More specifically, it is a feature of the present invention to provide an arm adapted to be mounted on the rock shaft of the cultivator and connections associated therewith for disengaging the planting and/or fertilizing drive whenever the tools are raised.

These and other objects and advantages of the present invention will be apparent to those skilled in the art after a consideration of the following detailed description, taken in conjunction with the accompanying drawings in which the preferred structure has been illustrated.

In the drawings:

Figure 2 is a fragmentary perspective view of the machine shown in Figure 1, with certain modifications, such as the addition of a fertilizer attachment with its furrow opener also carried on the cultivator beams;

Figure 3 is a fragmentary section taken generally along the line 3—3 of Figure 1, showing the planting attachment bracket for the left hand planting unit of Figure 1;

Figure 4 is a fragmentary perspective view, illustrating one means for supporting the seed can and associated parts at each side of the tractor, together with certain details of the operating connections;

Figure 5 shows another manner of supporting the fertilizer and planter furrow openers;

Figure 6 is a further modified form, illustrating the support of the fertilizer furrow opener by parallel links connected with the cultivator beam draft bar; and Figures 7 and 8 illustrate a modified form of rig coupling bracket.

Figure 1:
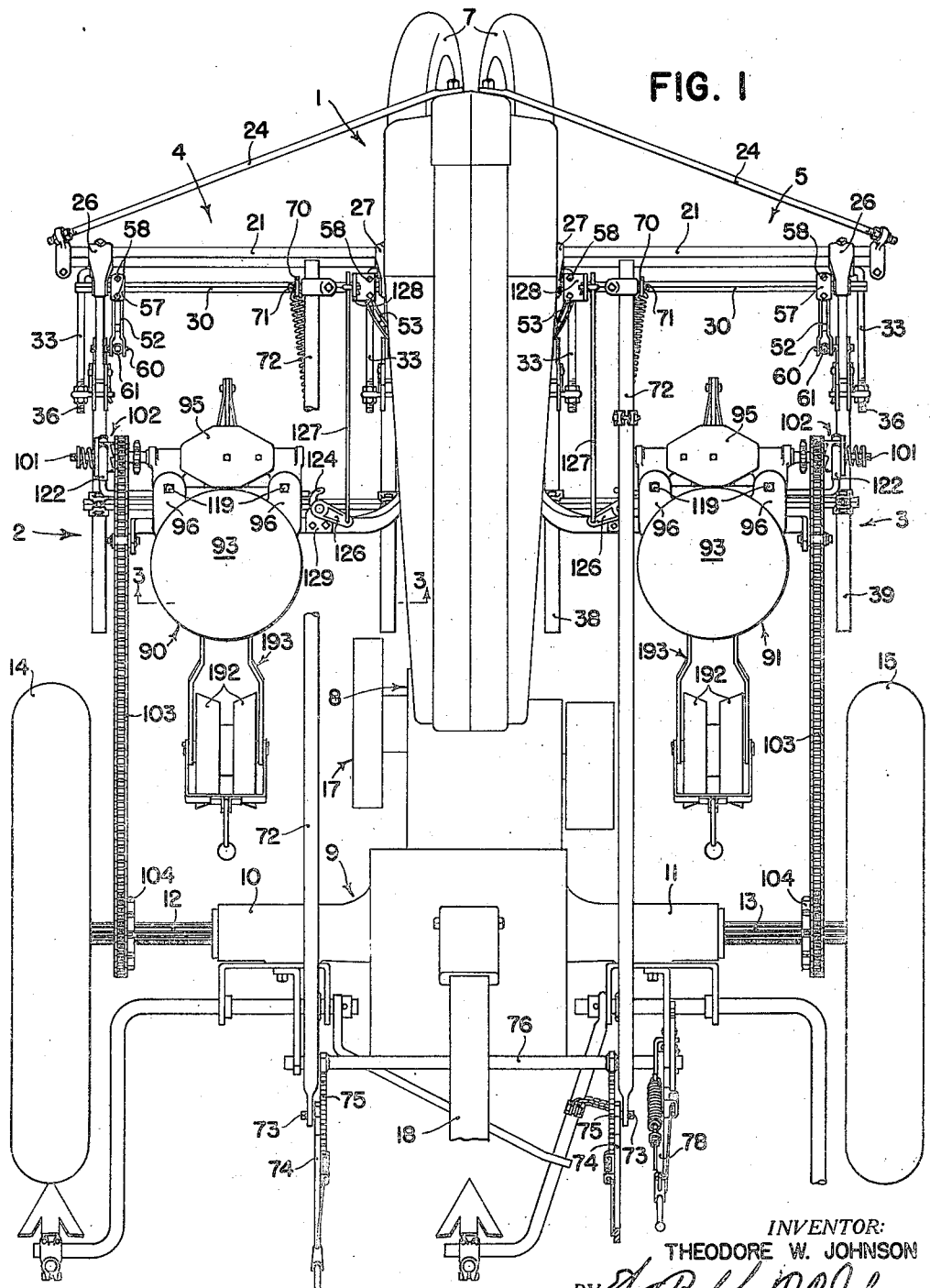
Figure 1 is a plan view of an agricultural machine embodying the principles of the present invention and showing the support of the planting units on the tractor with the furrow openers thereof carried on the cultivator beams.

Referring now more particularly to Figures 1 and 2, the agricultural machine in which the principles of the present invention have been incorporated comprises an implement in which a tractor, indicated in its entirety by the reference numeral 1, serves as supporting frame means for a pair of planting units 2 and 3. In general, these units are identical, except for some parts which are necessarily manufactured as right and left hand parts, and hence a description of the unit at one side of the tractor 1 will suffice. According to the principles of the present invention, the tractor 1 includes or carries parts of tractor mounted cultivator attachments indicated in their entirety by the reference numerals 4 and 5. These attachments, likewise, preferably are identical except that some parts are right hand parts and others are left hand parts, but generally speaking the parts of one cultivator unit are substantially identical with the parts of the other cultivator unit, at least so far as the parts of the cultivator units are included in the present machine.

The tractor 1 is of more or less a conventional construction widely used for row crop operations and comprises a suitable frame 6 supported at its forward end on a pair of front wheels 7 and including a transmission housing 8 and a rear axle construction 9. The latter includes laterally extending axle housings 10 and 11 in which axle shafts 12 and 13 are journaled for rotation. Upon the ends of the axle shafts 12 and 13 rear traction wheels 14 and 15 are fixed preferably for lateral adjustment relative thereto. Also, as best shown in Figure 1, the outer ends of the axle shafts 12 and 13 are splined. The tractor motor is indicated at 17, and a seat 18, forming an operator's station on the tractor adjacent the various controls, is fixed in any suitable manner to the frame or transmission housing.

Generally speaking, the cultivator units 4 and 5 are somewhat similar to the structures shown in my prior Patents 1,946,402, dated February 6, 1934, and Re. 21,317 dated January 9, 1940, and each cultivator unit includes a laterally outwardly extending transverse draft bar 21 suitably fixed to the tractor frame 6, as by a plate 22 fixed to the laterally inner end of the bar 21 (see Figure 6) and secured to the tractor frame by bolts 23. The outer end of each cultivator draft bar 21 preferably is braced by reenforcing rods 24, which are arranged as shown in my prior U. S. Patent No. 2,293,387, dated Apr. 22, 1941. Each cultivator unit includes a pair of draft arms or rig hangers 26 and 27. Preferably these parts are identical. Each rig hanger includes an upper arm section 29 which is apertured to receive bearing means in which a transverse rock shaft 30 is disposed. Each rig hanger also includes a lower bifurcated portion 31. The upper section 29 of each rig hanger is also apertured to receive the forward end of the upper link 33 of a pair of generally parallel links, the lower link of which is indicated by the reference numeral 34 and whose forward end is disposed between the lugs 31 constituting the bifurcated section aforesaid. Preferably, the upper link 33 is in the form of a rod having a laterally turned end pivoted in the rig hanger arm section 29 while the rear end thereof is threaded, as indicated at 36 in Figure 2. The lower link 34 is preferably in the form of a bar of rectangular cross section. This type of rig construction affords sufficient lateral rigidity for all cultivating operations.

As best shown in Figure 2, each of the pairs of links 33, 34 carries a cultivator tool beam, the tool beams of the cultivating unit 5 being indicated by the reference numerals 38 and 39. Preferably, however, each rig beam is identical with the associated beam, and they are maintained in laterally spaced generally longitudinally extending relation by suitable connections with the pairs of parallel links 33 and 34. As best shown in Figure 2, the laterally inner rig beam 38 carries a bracket 41 and the laterally outer beam 39 carries a bracket 42. These brackets are of substantially the same construction and each includes a pair of spaced apart plates 43 and 44 which are bolted, as at 45, to the associated rig beam. Being spaced apart, the plates 43 and 44 are disposed on opposite sides of the rear end of the associated link 34, and the latter is pivoted at its rear end to the plates 43 and 44 by a pivot member 46. At its upper end, each of the brackets or rig coupling arms 41 and 42 carries a pivot 49 suitably supported at the upper ends of the plates 43 and 44 and having an eye to receive the threaded end 36 of the associated upper link 33. Nuts 50 serve to adjustably fix each upper link 33 to the associated pivot 49. Loosening one of the nuts 50 and tightening the other will serve to adjust the effective length of the associated upper link 33, as will be readily understood. For raising the rig beams 38 and 39 an outer lifting arm 52 is fixed to the rock shaft 30 adjacent the rig hanger 26 and another lifting arm 53, which may be identical with the lifting arm 52, is fixed to the rock shaft 30 adjacent the inner rig hanger 27. Each of the arms 52 and 53 comprises a U-shaped strap serving as two laterally spaced plates or bars, and each arm is fixedly secured to the rock shaft 30 by means of a U-bolt 56, the ends of which are threaded and extend through a cap 57. Nuts 58 serve to clamp the cap 57 against the upper edge of the arm 52, thereby securing the latter to the rock shaft 30. The rear end of each of the arms 52 and 53 pivotally receives a swivel 60 through which the upper end of a lifting rod 61 extends. The lower end is bent laterally, as at 62, and is disposed in an opening in the lower link 34 of the associated pair of parallel links 33, 34. A spring 63 is disposed between a stop collar 64 fixed to each lifting rod 61 and the associated swivel 60. A pair of lock nuts 66 are carried at the upper threaded end of the lifting rod 61, whereby when the rock shaft 30 is rocked the arms 52 and 53 act through the associated lifting links 61 to raise the cultivator tool beams 38 and 39. When the rock shaft is rocked in the other direction, the springs 63 exert a yielding force tending to hold the cultivator tool beams down in their operating position.

Any suitable mechanism may be provided for rocking the rock shafts 30, but preferably means is provided at each side of the tractor 1 for operating the associated rock shaft 30 independently of the other, together with means for actuating both of the rock shafts 30 when desired. Such means will now be described.

An arm 70 is fixed at its lower end to the inner end of each rock shaft 30 and at its upper end the arm 70 is apertured to receive a pivot 71 by which a lift pipe 72 is pivotally connected to the arm 70. Each lift pipe 72 extends alongside the body of the tractor rearwardly to a hand lever 74 to which the pipe 72 is pivotally connected, as at 73. A sector 75 is fixed to a transverse rock shaft 76 carried at the rear of the tractor, and suitable latch mechanism on the hand lever 74 serves to fix the lever to the rock shaft 76. As best shown in Figure 1, there is a hand lever 74 at each side of the tractor, and the rock shaft 76 upon which the hand levers 74 are mounted is supported by any suitable means. A master lever 78 is fixed to the rock shaft 76, and by operating the master lever 78, both sets of cultivator beams 38 and 39 may be raised and lowered as desired. Also, suitable power lift raising and lowering connections may be provided instead of the hand lift just described, if desired.

The agricultural machine as so far described is essentially a part of a tractor mounted cultivator, and when used as such various kinds of tools may be fixed to the cultivator tool beams 38 and 39. To this end, each cultivator beam is proved with one or more cross arm clamps 81 in which the cross arm and associated tool shank and furrow opener may be fixed, each cross arm clamp including a pair of bolts 82 which fix the clamp 81 in adjusted position along the associated tool beam, and a bolt 84 which, when the machine is used as a cultivator, clamps the associated tool cross arm in place. Where it is desired to secure tools to the front ends of the cultivator beams 38 and 39, front clamps 86 are provided.

According to the principles of the present invention, I provide a planting and a fertilizing attachment utilizing the above-described cultivator beam structure and associated parts. Figures 1 and 2 disclose a planting implement which is made up of the tractor 1, the cultivator beam construction described above, and two planting attachments 90 and 91 which will now be described. Preferably, such attachments are identical, except that certain parts may be right hand and other parts left hand as will be readily understood, and hence a description of one of the units 90 and 91 will be sufficient. Each planting unit includes a seed container 93 which is mounted on a suitable base or supporting structure 94. The latter includes or supports suitable seed selecting mechanism which is driven by gearing enclosed in a casing 95 which forms a part of the base 94. The casing 95 is connected to the portion of the base receiving the seed can 93 by means of arms 96 which are apertured to receive means by which the seed can 93 and associated parts are fixed to a suitable support carried on the tractor. The particular details per se of the seed container and associated driving mechanism therefor do not form a part of the present invention except in so far as they are combined in a novel way with the other features of this invention. The seed can, seed selecting mechanism and driving means therefor are constructed generally along the lines of the planting units disclosed and claimed in the co-pending applications of Charles H. White, Serial No. 107,158, filed October 23, 1936, and Serial No. 311,583, filed December 29, 1939, to which reference may be had if necessary. As disclosed in said applications, the seed selecting mechanism associated with each seed can 93 is driven by a seeding shaft 101 which operates the gearing in the casing 95, and the seeding shaft 101 is driven through a controlling clutch 102 by a drive chain 103 trained at its rear end around a driving sprocket 104 fixed to the associated axle shaft, 12 or 13, at that side of the tractor.

To provide a suitable support for the seed cans 93 and associated parts, I provide a bracket 110, best shown in Figure 4, at each side of the tractor. Each bracket includes a flattened attaching section 111 which is apertured to receive bolts 112 by which the bracket is secured to the side bar of the tractor frame, and from the flattened section 111 the bracket 110 curves upwardly and forwardly, terminating in a laterally outwardly extending section 114, which preferably extends laterally outwardly at right angles with respect to the vertical longitudinal plane of the tractor. The section 114 is apertured to provide a number of bolt holes. A seed can support in the form of a casting 116 is fastened by bolts 115 to the bracket section 114, and the member 116 is provided at its rear side with a pair of laterally spaced bosses 117 which are slotted, as at 118, to receive the bolts 119 (Figure 2) by which the seed can base extension 96 is fixed in place. The seed can support 116 is formed with a passageway 121 in which the shank of a clutch fork 122 is disposed for movement laterally of the tractor. As best shown in Figure 2, the clutch fork 122 controls the seeding drive clutch 102. As shown in Figure 4, the inner end 123 of the clutch fork 122 is disposed against a cam 124 which is pivoted, as at 125, for rocking movement in a horizontal plane on a bracket 129 fastened by bolts 130 to the inner portion of the bracket 114. The cam 124 includes an arm 126 which is connected by a link 127 that extends forwardly and is connected to an arm 128 (Figures 1 and 6) that is rigidly fastened to the rock shaft 30. Preferably, the arm 128 is in the form of an angle member, one portion of which is slotted or apertured to receive the threaded ends of the inner lifting arm U-bolt 56, whereby both the inner lifting arm 63 and the clutch throw-out arm 128 are fixed to the rock shaft 30. Thus, when the rock shaft 30 is actuated to raise the cultivator beams 38 and 39, a forward force is exerted through the link 127 on the cam 124 which, in turn, moves the associated clutch fork 122 laterally outwardly against the action of a spring, thereby disconnecting the drive to the seeding shaft 101 at that side of the tractor. It will be understood that, if desired, the shaft 101 may extend all the way from one side of the tractor to the other, and may be arranged to drive the seeding mechanisms at both sides of the tractor, but preferably, as shown in Figure 1, the planting unit at each side of the tractor has its own drive and its own lifting and seed drive controlling mechanism, thereby permitting either planting unit to operate independently of the other. The outer end of the bracket section 114 adjustably supports an idler pulley 131 which serves as a tightener for the chain 103, as best shown in Figure 2. Preferably, the idler 131 is mounted in a slotted portion of a bracket 132. The bracket 110 and/or the seed can support 94 may be reenforced by suitable braces 133 where necessary.

Each of the seeding mechanisms 2 and 3 (Figure 1) includes a seed discharge spout 135 (Figure 2) which is formed as a part of the seed can base 94 and is arranged to direct the seed selected into a seed tube funnel 136 which is fastened, as at 137, to the base 94. The seed tube 138 is fastened at its upper end to the funnel 136 and at its lower end to the upper end of the shank 141 of a planter furrow opener 142. The furrow openers associated with the planting units 2 and 3 may take one of any number of suitable forms, the form shown in Figures 1 and 2 being of the runner type in which a runner 143 is fastened by any suitable means to the opposite sides of a runner seed boot 144, of which the shank 141 is a part. The seed boot 144 and the forward end of the runner 143 are fastened to a runner frame 146, comprising two laterally spaced plates 147, as in conventional construction.

According to the principles of the present invention, the planter furrow opener 142 at each side of the tractor is supported firmly and rigidly on the two cultivator beams 38 and 39 at each side of the tractor. To this end, the two plates 147 for each furrow opener 142 are formed to receive therebetween a cross bar clamp 149, the latter being bolted in position between the plates 147 by a pair of bolts 150. The clamp member 149 is formed to receive a cross bar 152, and a clamp cap 153 is secured, as by bolts 154, to the clamp 149, with the cross bar 152 therebetween, as best shown in Figure 2. The cross bar 152 is supported in the transversely split portion 155, 156 of the cross arm clamps 81 that receive the cultivator tool supporting cross arms. It will be noted from Figure 2 that the planter runner supporting cross arm 152 is a single rigid member that extends transversely from one cultivator tool beam 38 to the other cultivator tool beam 39. Thus, the rigid transverse member 152 ties the two cultivator tool beams together in such a manner as to materially increase the lateral rigidity of the two beams over the degree of lateral rigidity that they possess when they are not tied together, as when equipped individually with cultivator shovels or other tools. In effect, therefore, the planter furrow opener support bar 152 not only ties the two cultivator beams 38 and 39 together but, in addition, acts through the two pairs of generally parallel links 33 and 34 and associated parts to connect the associated planter furrow opener with the laterally extending draft beam 21 at two widely separated laterally spaced points. This is an important feature of the present invention since, as mentioned above, laterally directed stresses in the course of the tractor is shifted are materially greater when using planter furrow openers than when using cultivator shovels or the like, and moreover, variations in the lateral position of the tools in a planting implement are to be avoided as far as possible since accurate row spacing when planting is an important desideratum.

It will be seen, especially from Figure 2, that the row spacing may be readily adjusted easily and conveniently. The rig hangers 26 and 27 may be shifted on the transverse draft bar 21, or if it is not desired to disturb the lateral adjustment of the cultivator rig beams, having in mind their further use as cultivating means, the bolts 84 may be loosened and the bar 152 shifted laterally, as desired. If more adjustment than that afforded by lateral movement of the bar 152 is desired, then the bolts 154 may be loosened and the planter furrow opener 142 shifted laterally along the beam 152. This is perhaps the most convenient adjustment under most conditions. In Figure 2, the clamps 81, bar 152, and associated parts are arranged for planting on ridges or on relatively level land. For planting in furrows the clamps 81 may be turned so that the bar 152 is underneath the cultivator beams 38 and 39. This is a convenient and valuable feature of my invention inasmuch as it enables the manufacturer, as well as the farmer himself, to readily arrange the implement for ground conditions to be encountered.

The present invention, involving novel means for supporting the furrow openers of planting attachments on associated cultivator beams, is also concerned with fertilizer attachments and the support of fertilizer furrow openers also on the cultivator beams in the desired relation relative to the associated planter furrow openers. Figue 1 shows the use only of the planting units 2 and 3, but Figure 2, in addition, shows the application of a fertilizer attachment to the tractor 1 forwardly of the planting units 2 and 3. Referring now more particularly to this latter figure, the fertilizer attachment unit at each side of the tractor 1 is indicated in its entirety by the reference numeral 170, and each fertilizer attachment unit includes a fertilizer can 171 carried on a supporting base structure 172. The means for supporting and driving the fertilizer unit is substantially the same as the mechanism shown in the above-mentioned White co-pending application. Briefly, the fertilizer can support or hopper bottom 172 is provided with a pair of arms 173 which are adapted to be connected to the laterally extending portions of the planting unit gear casing 95, the fertilizer agitating and feeding mechanism being driven from the gearing in the casing 95 by sprocket and chain means 175, the details of which are shown in the above-mentioned White co-pending application and which do not per se form any part of the present invention except in novel combination with the other features of this invention. The fertilizer hopper bottom 172 is provided with a fertilizer spout section 176 and a fertilizer tube 177 which, like the seed tube 138, is of the flexible ribbon type. The fertilizer tube 177 is connected at its lower end to a fertilizer opener shank 178 which forms a part of a fertilizer furrow opener 180. The fertilizer hopper 171 and associated parts are braced by means of a bar 182 which at its forward end is rigidly fixed to the outer portion of the draft bar 21 by any suitable means, such as a U-bolt 183 which embraces the draft bar 21 and a cap 184 to which the ends of the U-bolt extend and which receive nuts by which the parts are fixed to the transverse draft bar 21. The bracing bar 182 extends rearwardly and receives a bracket 185 which is bolted, as at 186, to the bar 182 and at its upper end serves as a support for the fertilizer hopper bottom 172. The rear end of the brace bar 182 is fastened, as at 187, to the outer end of the associated bracket 110, as best shown in Figure 4.

Each fertilizer furrow opener 180 is, according to the present invention, particularly as shown in Figure 2, supported at the front ends of the two associated cultivator beams 38 and 39, and to this end I provide a cross bar 152a, which may be identical with the cross bar 152 described above, but extends across from one front cross arm clamp 86 to the other, thereby rigidly tying the front ends of the cultivator beams 38 and 39 together. Like the cross bar 152 described above, the front cross bar 152a is a single rigid member, and either may be a solid bar or a tubular member, according to the strength desired or according to conditions that will be encountered. The solid type is shown in Figure 2 and the tubular type will be shown in connection with modifications to be described below. Each of the front cross arm clamps 86 is formed with forwardly extending sections 189, each pair of which carries a clamping bolt 190 which, when tightened, serves to clamp the fertilizer furrow opener supporting bar 152a rigidly to the front ends of the two associated cultivator beams 38 and 39. When the beams are used to support cultivator tools, a cultivating tool is individually supported by each of the cross arm clamps 86. For fixing the cultivator furrow opener 180 to the cross bar 152a, a clamp like the clamp 81 may be utilized, as indicated at 81a, the round bar receiving portion of which serving to receive the upper end of the shank 178, and the square bar receiving section receiving the bar 152a. Like the associated planter furrow opener 142, the fertilizer furrow opener 180 may be adjusted by loosening the clamping bolts or fixing the clamp 81a to the bar 152a and sliding the clamp laterally in one direction or the other, as desired. Normally, the fertilizer furrow opener 180 is adjusted so as to deposit the fertilizer to one side of the line of travel of the planter furrow opener 142 immediately behind, although this may vary as desired. It will be noted that the brace or supporting bracket 110 upon which the seed hopper 93 and associated parts are supported is disposed rearwardly of the upwardly extending link brackets 41 and 42. This serves to prevent any interference between the planting and/or fertilizing units and the cultivator beam attaching brackets 41 and 42. It will also be seen that the bracing bar 182 is disposed inwardly of the outer set of parallel links and their associated cultivator beam attaching bracket 42. Thus, there is ample clearance for all of the generally vertically moving parts of the cultivating implement which are utilized in making up the planting and/or fertilizing implement. It will also be obvious that when the lifting arms 52 and 53 are actuated, as by rocking the shaft 30, the fertilizer furrow opener 180 is raised with the planter furrow opener 142.

As best shown in Figure 1, each of the planter furrow openers 142 may have associated therewith a pair of press wheels 192 which are supported in a press wheel frame 193 secured, as at 194 (Figure 2), to the runner frame 146. The press wheel frame 193 preferably comprises a pair of bars 196, and to the bars 196 is attached a pair of knife coverers 197, as shown in Figure 2, of more or less conventional construction.

Figure 5 illustrates a slightly modified form of the present invention wherein a sweep type furrow opener unit, indicated in its entirety by the reference numeral 200, is utilized. The unit 200 includes a sweep 201 bolted, as at 202, to a sweep standard 203, the upper end of which is formed, as at 204, to receive the cross bar 205, which may be identical with the cross bar 152 described above, and preferably the bar 205 is rigidly fastened to the cultivator beams 38 and 39 in substantially the same way. A cap 207 is bolted, as at 208, to the upper end of the sweep standard. A pair of plates 210 are bolted, as at 211, to the sweep standard 203 and at their rear ends are bolted to a seed boot 212 into which the lower end of the seed tube 138 extends. The seed boot 212 carries a planter furrow opener 214 of the runner type. A fertilizer boot 217 is clamped by a U-bolt 218 to a fertilizer boot clamp bracket 219, and the latter is bolted, as at 220, to at least one of the plates 210. The boot 217 supports a furrow opener 221 of the subsoiler type. As shown in Figure 5, the fertilizer tube 177 extends downwardly rearwardly of the bar 205 and connects at its lower end with the upper end of the fertilizer boot 217. However, if desired, the clamp 219 may be reversed to dispose the fertilizer boot 217 farther forward, and the fertilizer tube 177 in that case may extend downwardly in front of the bar 205. Shovel coverers 225 are connected to supporting shanks 226 which are clamped, as at 227, to a coverer frame 228. The frame 228 is bolted to the plates 210 in any suitable manner. If desired, knife coverers may be substituted for the shovel coverers 225, and likewise disk coverers may be utilized.

In both Figures 2 and 5, it will be noted that the cross bar, 152 or 205, is clamped to the cultivator beams 38 and 39 rearwardly of the brackets 41 and 42. This has the advantage that the distance from the draft bar 21 to the furrow opener or openers carried by the cross bar is a substantial amount, whereby vertical rising and falling movements of the furrow opener or openers provide an easy floating action in which the angular movement of the connecting links 33, 34 is not great, as would be the case if the furrow openers were coupled closer to the draft bar. In Figure 5, the draft bar, indicated at 21a, is shown as a round pipe, whereas in Figure 2 the draft bar 21 is a square bar. Either form may be used as desired.

In Figures 1 and 2 I have shown the runner type of planter furrow openers, which is generally used for planting on level land or in furrows, and in Figure 5 I have shown the sweep type which is generally used for sweeping the top of the bed or for planting in furrows, and in both forms I have shown the fertilizer attachment as arranged to place the fertilizer to the side of the seed and below the level thereof, which is generally the accepted method recommended by leading agricultural authorities.

In Figure 6 I have shown a third type of planter furrow opener, namely, the shoe type which is used for planting on level land or on the top of the beds. Generally speaking, the shoe type of furrow opener includes the several parts of the runner type, with additional gauge shoes and associated brackets. Therefore, in as far as Figure 6 shows the same parts as shown in Figure 2 and described above, the same reference numerals are used in Figure 6. From this figure it will be seen that the front ends of the runner frame plates 147 are slotted, as at 240, to receive a pair of bolts 241 which fasten the upper ends of a pair of straps 243, the lower ends of which are pivoted to brackets 244 that are fixed in laterally spaced relation to the forward portion of a gauge shoe 245. The latter is split, as at 246, so as to receive the runner 143, the two side portions of the gauge shoe 245 extending rearwardly alongside the seed boot portion 141 thereof, being fixed to the rear portions of the runner frame plates 147 by means of a pair of brackets 247. A sweep angle 250 is fixed to the gauge shoe 245 at each side of the associated seed boot 141 and is bolted or otherwise fixed in position in any suitable manner. The bolts securing the forward end of each of the sweep angles 250, are indicated in Figure 6 by the reference numeral 261. It will also be noted in this figure that the rigid cross bar to which each planter furrow opener is clamped, is, in this form, a tubular member, indicated at 152b. The cross bar may, of course, be solid if desired.

In this form of the invention the fertilizer tube 177 of the fertilizer attachment 170 discharges into a fertilizer boot which is mounted separately from the cultivator beams 38 and 39. In this form of the invention, the fertilizer boot 260 receives the lower end of the fertilizer tube 177 and is equipped with a furrow opener 261 of the runner type. A bracket 262 is fixed, as at 263, to the forward end of the runner 261 and at its rear end extends upwardly, being bolted as at 264 to the upper end of the fertilizer boot 260. The upper portion of the bracket 262 receives a pair of vertically spaced pivots or bolts 266 to which the rear ends of a pair of link members 277 and 278 are pivoted. The forward ends of the links 277 and 278 are pivoted, as at 280 and 281, to the lower end of a vertically extending bracket 282. The upper end of the bracket 282 is fixed, as by a U-bolt 283, to the associated draft bar 21, preferably between the points where the rig hangers 26 and 27 are clamped thereto. The links 277, 278 extend generally rearwardly in parallelism and provide for vertical floating movement of the fertilizer runner relative to the means that supports the same. However, in order to insure that the fertilizer will be deposited in the correct relation relative to the seed deposited by the planter furrow opener, the seed boot 260 is provided with a lug 286 in which the lower end of a link 287 is pivoted. The link 287 extends upwardly through an eye-bolt 288 carried at the forward end of an arm 289, the rear end of which is fixed, as by a U-bolt 291, to the cross bar 152b to which is clamped the planter furrow opener, by the means described above in connection with Figure 3. A spring 293 surrounds the rod 287 and at its lower end bears against a collar 294 adjustably fixed to the rod 287. At its upper end the spring 293 bears against the eye-bolt 288. A nut 295 is carried at the upper end of the rod 287 and forms adjustable means limiting the downward movement of the fertilizer furrow opener 261 relative to the cross bar 152b which it will be remembered carries the planter furrow opener. The spring 293 therefore serves as a resilient connection between the planter furrow opener and the fertilizer furrow opener, acting at all times to yieldingly hold the fertilizer furrow opener in the proper position relative to the planter furrow opener. However, if the fertilizer furrow opener should encounter an obstruction, the spring 293 permits the same to yield upwardly under the action of the parallel links 277 and 278, and if the planter furrow opener encounters the obstruction, it yields upwardly as permitted by the generally parallel links 33 and 34. Being clamped to the draft bar 21 by a U-bolt, similar to the other U-bolts described above, which is easily loosened, it will be seen that the matter of adjusting the lateral position of the fertilizer furrow opener 261 relative to the tractor and/or to the planter furrow opener associated therewith may be easily adjusted. Since the furrow opener unit shown in Figure 6 is provided with a gauge shoe, the pressure springs 63 and collars 64, shown in Figure 2, surrounding the lifting rods 61 normally are not necessary and hence they have been omitted in Figure 6.

In Figures 1, 2, 5 and 6, the rig arms or brackets 41 and 42 have been shown as pairs of separate plates 43 and 44. If desired, particularly for cultivating, a simpler form may be used such as is shown in Figures 7 and 8. In these figures, the rig coupling arm or bracket is shown as an inverted U-shaped strap 300, the ends 301 and 302 of which are notched, as at 304 to receive the cross bar 152d or some other kind of tool bar. The sections 301 and 302 are apertured to receive a pin or rivet 306, upon which a spacer 307 is mounted, and the pivot 46 to which the rear end of the associated drag link 34 is connected. Adjacent its upper end the bracket is apertured, as at 309, to receive the laterally turned end 310 (Figure 7) of an upper drag link 311, which may otherwise be substantially the same as the upper drag link 33 described above. The tool bar 152d is clamped in the notches 304 by a cap 315, the ends of which are apertured to receive a pair of bolts 316 that extend rearwardly between the lower ends of the bracket sections 301 and 302 and receive a plate 318 to which a rig beam 319 is fixed as by welding. The front ends of the links are connected with the tractor draft bar 21 in the same manner as the links 33 and 34, or in any other suitable manner desired.

While I have shown and described above the preferred means in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement comprising a supporting frame, planting mechanism and fertilizer dispensing mechanism carried thereby, a pair of laterally spaced generally longitudinally extending cultivator beams, a generally upwardly extending bracket fixed to each beam, generally parallel links movably connecting each bracket with said supporting frame, said planting and fertilizer mechanisms being disposed substantially above said cultivator beams, a rigid bar disposed transversely of said beams, means at the outer ends of said rigid bar for securing the latter to said beams rearwardly of the brackets secured thereto, a second rigid bar, means at the outer ends of said second rigid bar for securing the latter to said beams forwardly of said brackets, a planter furrow opener receiving seed from said planting mechanism and secured to said first rigid bar between said cultivator beams, and a fertilizer furrow opener receiving fertilizer from said fertilizer dispensing mechanism and secured to said second rigid bar also between said cultivator beams, whereby said planter and fertilizer receiving furrow openers move together.

2. An agricultural implement comprising a supporting frame, a transverse draft bar carried thereby, a pair of laterally spaced generally longitudinally extending cultivator beams movably connected with said draft bar, a container and feeding mechanism carried on said supporting frame, a rigid bar disposed transversely of said beams, means at the outer ends of said rigid bar for securing the latter to the rear portions of said beams, a furrow opener fixed to said rigid bar, means for delivering material from said feeding mechanism to said furrow opener, means for driving said mechanism, means on said supporting frame for raising said cultivator beams and said furrow opener upwardly out of working position, and means responsive to the movement of said cultivator beams out of their working position for interrupting the drive to said feeding mechanism.

3. An agricultural implement comprising a supporting frame, a transverse draft bar carried thereby, a pair of laterally spaced generally longitudinally extending cultivator beams, laterally spaced link means connecting said beams with said transverse draft bar a rockshaft carried by said draft bar, arms connected with said rockshaft and with said cultivator beams whereby the latter may be raised and lowered by rocking said rockshaft, a rigid bar disposed transversely of said beams, a container and feeding means carried by said supporting frame, a furrow opener secured to said rigid bar, means for delivering material from said feeding mechanism to said furrow opener, and means whereby said furrow opener may be adjusted laterally on said rigid bar, said arms may be adjusted along said rockshaft, and said links may be adjusted laterally relative to said transverse draft bar so as to provide for various row spacings.

4. An attachment for a tractor mounted cultivator having a pair of laterally spaced cultivator tool beams and brackets fixed thereto for connection with the tractor, said attachment comprising a bar adapted to be fixed at its ends to said laterally spaced tool beams in a position transversely of the latter and rearwardly of said brackets for rigidly connecting said beams, a container mounted on said tractor above said rigid transverse bar and generally rearwardly of said brackets, a tube leading substantially directly downwardly from said container, ground engaging means carried by the generally central portion of said transverse rigid bar in a position to receive the lower end of said tube, a second container mounted on the tractor forwardly of said first container, a tube leading downwardly therefrom forwardly of said transverse bar and in a generally vertical plane between said beams, and a furrow opener connected with the lower end of said last mentioned tube and disposed generally forwardly and to one side of the ground engaging means that is fixed to the central portion of said transverse bar.

5. An attachment for a tractor mounted cultivator having a pair of laterally spaced cultivator tool beams and brackets fixed thereto for connection with the tractor, said attachment comprising a bar adapted to be fixed at its ends to said laterally spaced tool beams in a position transversely of the latter and rearwardly of said brackets for rigidly connecting said beams, a container mounted on said tractor above said rigid transverse bar and generally rearwardly of said brackets, a tube leading substantially directly downwardly from said container, ground engaging means carried by the generally central portion of said transverse rigid bar in a position to receive the lower end of said tube, a second container for fertilizer mounted on the tractor forwardly of said first container, a fertilizer tube leading downwardly therefrom forwardly of said transverse bar and in a generally vertical plane between said beams, a furrow opener connected with the lower end of said fertilizer tube and disposed generally forwardly and to one side of the ground engaging means that is fixed to the central portion of said transverse bar, and means fixed to the forward end of one of said tool beams for supporting said furrow opener.

6. An attachment for a tractor mounted cultivator including a transverse draft bar carried by the tractor, a pair of generally longitudinally extending laterally spaced apart cultivator tool beams movably connected with said draft bar, and a rock shaft on the latter for raising said beams, said attachment comprising a rigid transverse member adapted to be connected with the rear portions of said cultivator beams, a furrow opener, means fixing the latter to said rigid member, a container and feeding mechanism adapted to be mounted on the tractor, means for driving said mechanism including a clutch, means for delivering material from said mechanism to said furrow opener, an arm adapted to be attached to said rock shaft, and means connecting said arm and clutch for interrupting the drive to said feeding mechanism whenever said shaft is rocked to raise said cultivator beams.

7. An agricultural implement comprising the combination with a tractor, of a transverse draft bar, a planting unit at each side of the tractor, including a seed can and seed selecting mechanism carried on the tractor and a seed furrow opener adapted to receive seed from said mechanism, and a pair of laterally spaced link means connecting each of said furrow openers with said transverse draft bar, said link means being connected to said transverse draft bar at widely spaced points on the latter so as to hold said seed furrow opener against lateral displacement relative to the tractor.

8. An agricultural implement comprising the combination with a tractor, of a transverse draft bar, a planting unit at each side of the tractor, including a seed can and seed selecting mechanism carried on the tractor and a seed furrow opener adapted to receive seed from said mechanism, two generally laterally spaced pairs of approximately parallel links connecting each seed furrow opener with said draft bar at laterally spaced points, fertilizer distributing means including a fertilizer furrow opener at each side of the tractor, and means connecting each fertilizer furrow opener with the two pairs of links with which the seed furrow opener is connected.

9. An agricultural implement comprising the combination with a tractor, of a transverse draft bar, a planting unit at each side of the tractor, including a seed can and seed selecting mechanism carried on the tractor and a seed furrow opener adapted to receive seed from said mechanism, a pair of laterally spaced apart generally longitudinally extending bars at each side of the tractor pivotally connected at laterally spaced apart points to the transverse draft bar at that side of the tractor, a single transverse bar rigidly interconnecting each of said pair of bars, means connecting each furrow opener with the associated transverse bar, a fertilizer container and distributing mechaninsm carried by said tractor, a fertilizer tube and ground engaging furrow opener for depositing fertilizer in the ground, link means connecting said last mentioned furrow opener with said transverse draft bar and spring means reacting against said transverse rigid bar for holding the fertilizer furrow opener in working position.

10. An agricultural implement comprising a supporting frame, a transverse draft bar carried thereby, a pair of laterally spaced generally longitudinally extending cultivator beams movably connected with said draft bar, a rigid cross bar disposed transversely of said beams, and reversible clamps for clamping said cross bar to said cultivator beams, optionally below or above said beams.

11. An agricultural implement comprising a supporting frame, a transverse draft bar carried thereby, a pair of laterally spaced generally longitudinally extending cultivator beams movably connected with said draft bar, a rigid bar disposed transversely of said beams, means at the outer ends of said rigid bar for securing the latter to the rear portions of said beams, a planter furrow opener secured to said rigid bar, and marker means connected with the outer end of said rigid bar.

12. An agricultural implement comprising a supporting frame, a transverse draft bar carried thereby, a pair of laterally spaced generally longitudinally extending cultivator beams movably connected with said draft bar, a rigid cross bar disposed transversely over and secured to said beams, one end of said cross bar extending laterally outwardly beyond the outer cultivator beam, a planter furrow opener secured to said rigid cross bar, a generally vertically disposed marker standard, means clamping said standard to the outer end of said rigid cross bar, and a marker arm pivoted to said standard.

13 An agricultural implement comprising a supporting frame, a transverse draft bar carried thereby, a pair of laterally spaced generally longitudinally extending cultivator beams movably connected with said draft bar, a rigid cross bar disposed transversely over and secured to said beams, one end of said cross bar extending laterally outwardly beyond the outer cultivator beam, a planter furrow opener secured to said rigid cross bar, a generally vertically disposed marker standard, means clamping said standard to the outer end of said rigid cross bar, a marker arm pivoted to said standard, and marker arm controlling means extending from said marker arm to the upper end of said standard.

14. An agricultural implement comprising a supporting frame, a transverse draft bar carried thereby, a pair of laterally spaced generally longitudinally extending cultivator beams movably connected with said draft bar, a rigid bar disposed transversely of said beams, a fertilizer container and distributing mechanism carried by said supporting frame, a fertilizer furrow opener movably connected with said transverse draft bar and adapted to receive fertilizer from said distributing mechanism, and spring means reacting against said transverse rigid bar for holding the fertilizer furrow opener in working position.

15. An agricultural implement comprising the combination with a tractor, of a transverse draft bar, a planting unit at each side of the tractor, including a seed can and seed selecting mechanism carried on the tractor and a seed furrow opener adapted to receive seed from said mechanism, a pair of laterally spaced apart generally longitudinally extending bars at each side of the tractor pivotally connected at laterally spaced apart points to the transverse draft bar at that side of the tractor, a single transverse bar rigidly interconnecting each of said pairs of bars, means connecting each furrow opener with the associated transverse bar, fertilizer distributing mechanism including a fertilizer container and feeding means carried by the tractor, a fertilizer furrow opener at each side of the tractor receiving fertilizer from said feeding means, a bracket rigidly fixed in depending relation to said draft bar at each side of the tractor, and a pair of approximately parallel links connecting each fertilizer furrow opener with the associated bracket forward of the associated seed furrow opener.

16. An agricultural implement comprising the combination with a tractor, of a transverse draft bar, a planting unit at each side of the tractor, including a seed can and seed selecting mechanism carried on the tractor and a seed furrow opener adapted to receive seed from said mechanism, a pair of laterally spaced apart generally longitudinally extending bars at each side of the tractor pivotally connected at laterally spaced apart points to the transverse draft bar at that side of the tractor, a single transverse bar rigidly inerconnecting each of said pairs of bars, means connecting each furrow opener with the associated transverse bar, fertilizer distributing mechanism including a fertilizer container and feeding means carried by the tractor, a fertilizer furrow opener at each side of the tractor receiving fertilizer from said feeding means, a bracket rigidly fixed in depending relation to said draft bar at each side of the tractor and connected for generally free vertical movement relative to the associated seed furrow opener, and a pair of approximately parallel links connecting each fertilizer furrow opener with the associated bracket forward of the associated seed furrow opener.

17. An agricultural implement comprising a supporting frame, a transverse draft bar carried thereby, a seed furrow opener, a pair of laterally spaced apart link means movably connecting said seed furrow opener with said transverse draft bar at laterally spaced points on the latter, a fertilizer furrow opener, and link means connecting the latter furrow opener with said transverse draft bar in between said laterally spaced points.

18. An agricultural implement comprising a supporting frame, a transverse draft bar carried thereby, a seed furrow opener, bracket means movably connecting said seed furrow opener with said draft bar, a fertilizer furrow opener, a bracket separate from said bracket means and fixed to said draft bar generally forward of said seed furrow opener, and a pair of generally parallel links connecting said fertilizer furrow opener with said bracket.

19. A planter and fertilizer attachment for a tractor-mounted cultivator of the type having a transverse draft bar attachable to the tractor and a pair of laterally spaced cultivator beams individually connected for independent movement with said draft bar, said planting and cultivator attachment comprising a support adapted to be attached to the tractor, seed and fertilizer dispensers carried by said support, separate seed and fertilizer furrow openers, and means for mounting both of said furrow openers on said pair of cultivator beams.

20. A planter and fertilizer attachment for a tractor-mounted cultivator of the type having a transverse draft bar attachable to the tractor and a pair of laterally spaced cultivator beams individually connected for independent movement with said draft bar, said planting and cultivator attachment comprising a support adapted to be attached to the tractor, seed and fertilizer dispensers carried by said support, separate seed and fertilizer furrow openers, bar means adapted to rigidly connect said laterally spaced cultivator beams, and means for mounting both of said furrow openers on said bar means.

21. An agricultural implement comprising a supporting frame, seed dispensing means carried thereby, a pair of laterally spaced generally longitudinally extending cultivator beams, a generally upwardly extending bracket fixed to each beam, generally parallel links movably connecting each bracket with said supporting frame, a rigid bar disposed transversely of said beams, means at the outer ends of said rigid bar for securing the latter to said beams, a tool shank fixed to said rigid bar between said cultivator beams in depending relation, a tool secured to the lower end of said shank, a part secured to said tool shank above said tool and extending rearwardly, a seed furrow opener fixed to said part, and a seed tube leading from said dispensing means to said seed furrow opener.

22. An agricultural implement comprising a supporting frame, seed and fertilizer dispensing means carried thereby, a pair of laterally spaced generally longitudinally extending cultivator beams, a generally upwardly extending bracket fixed to each beam, generally parallel links movably connecting each bracket with said supporting frame, a rigid bar disposed transversely of said beams, means at the outer ends of said rigid bar for securing the latter to said beams, a tool shank fixed to said rigid bar between said cultivator beams in depending relation, a tool secured to the lower end of said shank, a part secured to said tool shank above said tool and extending rearwardly, seed and fertilizer furrow openers fixed to said part, and seed tubes leading from said dispensing means to said furrow openers, respectively.

23. An agricultural implement comprising the combination with a tractor, of a transverse draft bar fixed to the tractor adjacent the forward end, a pair of laterally spaced generally longitudinally extending cultivator beams, a generally upwardly extending bracket fixed to each beam, generally parallel links movably connecting each bracket with said transverse draft bar, fertilizer distributing mechanism including a fertilizer container and feeding means carried by the tractor, a fertilizer furrow opener receiving fertilizer from said feeding means, a seed container and seed selecting means carried by the tractor, a seed furrow opener receiving seed from said seed selecting means and disposed generally rearwardly of said fertilizer furrow opener, a rigid bar connecting the front ends of said cultivator beams, a second rigid bar connecting said cultivator beams rearwardly of said first bar, means securing said fertilizer furrow opener to said first bar, and means securing said seed furrow opener to said second rigid bar.

24. In an agricultural implement, a cultivator beam, a link-receiving bracket secured to said beam and comprising an inverted U-shaped strap having spaced apart sections, a link pivoted to said bracket in confined relation between said sections, and a rigid cross bar clamped to said beam.

25. In an agricultural implement, a cultivator beam, a link receiving bracket fixed thereto and comprising a pair of spaced apart sections each having a notch in one edge, means securing said bracket to said beam, and a rigid cross bar clamped in said notches.

26. An agricultural implement comprising a supporting frame, dispensing means carried thereby, a pair of laterally spaced generally longitudinally extending cultivator beams, a generally upwardly extending bracket fixed to each beam, generally parallel links movably connecting each bracket with said supporting frame, a rigid bar disposed transversely of said beams, means at the outer ends of said rigid bar for securing the latter to said beams, a tool shank fixed to said rigid bar between said cultivator beams in depending relation, a tool secured to the lower end of said shank, a part secured to said tool shank above said tool and extending rearwardly, a furrow opener fixed to said part, and a tube leading from said dispensing means to said furrow opener.

THEODORE W. JOHNSON.